March 22, 1949.  W. P. RADER  2,464,941
C-CLAMP SCREW CRANK
Filed Oct. 17, 1945
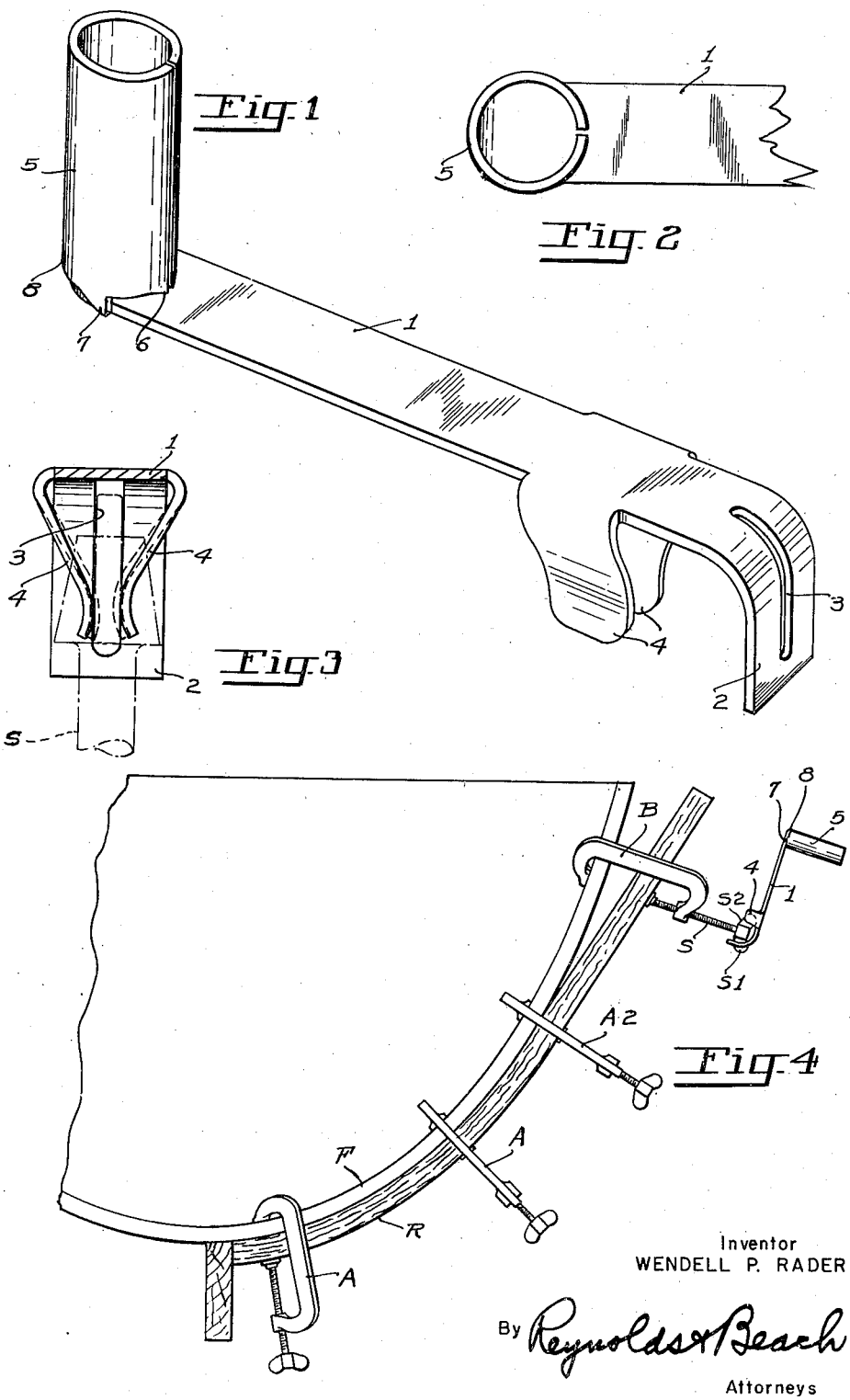
Inventor
WENDELL P. RADER
By Reynolds & Beach
Attorneys Patented Mar. 22, 1949

2,464,941

UNITED STATES PATENT OFFICE 2,464,941

C-CLAMP SCREW CRANK

Wendell P. Rader, Seattle, Wash., assignor of one-half to Frank Adams, Seattle, Wash.

Application October 17, 1945, Serial No. 622,859

10 Claims. (Cl. 74—545)

C-clamps are used in many arts, for example, in carpentry and boat building. Often the screw of such a C-clamp has to be turned down through a considerable distance into final clamping position. Often too, a number of C-clamps have to be secured to a work piece in a comparatively short interval of time while that work piece is properly conditioned. For example, it may be necessary to secure two pieces together immediately after application of quick-setting glue to their joining edges, or it may be necessary, as is illustrated in the drawings, to clamp a steamed or heated piece of wood, such as the rib of a boat, to the form while the rib is sufficiently heated to permit it to be bent.

C-clamps, as ordinarily constructed, are provided with two outstanding wings fixed to the outer end of the screw, or, less commonly, a crossbar slidable transversely in the outer end of the screw, or a handle pivoted to the screw end by a pin transversely of such end, whereby the screw may be turned. The slidable crossbar or swingable handle affords greater leverage for turning the screw against resistance, but either is somewhat in the way, both when the C-clamp is not in use and during the time it is being used for clamping. They can be at best but of limited length, and can not readily be grasped for rapid rotation.

Since time in the application of such C-clamps is frequently an important factor, and since it is always desirable to be able to apply adequate force to turn the screw, it is the object of the present invention to provide a crank type of handle which may be applied to such C-clamp screws, particularly those having oppositely directed wings, by which adequate force may be applied to turn the screw, by which the screw can be turned as rapidly as the hand may rotate it, and which can be readily detached from the screw when required for immediate and ready application to another in a series of clamps to be tightened.

It is also an object to provide such a C-clamp screw crank handle which will sustain itself upon the screw when once applied thereto, even though the C-clamp is inverted, but which still can be quickly detached from or attached to the screw.

It is likewise an object of the invention to provide such a crank which may be simply and conveniently made, as by stamping processes, from a flat metal bar or plate, and which therefore is simple and inexpensive.

With these and other objects in mind, as will appear hereafter, my invention comprises the novel crank, and the novel arrangement of the several parts thereof, as shown in the accompanying drawings, described in this specification and defined by the claims.

In the accompanying drawings the invention is disclosed in a representative form, although it will be evident that changes may be made in the device, within the ambit of the appended claims, without departing from the spirit of the invention.

Figure 1 is a perspective view of the crank as a whole.

Figure 2 is a top plan view of the rotative end of the crank, illustrating the formation of the handle by which it may be grasped or turned.

Figure 3 is a transverse section, looking away from the handle end of the crank, and showing the means by which it engages the opposite wings of the clamp screw.

Figure 4 is an elevation illustrating a typical manner of using such C-clamps, and showing the importance of being able to screw up the screws of successive clamps rapidly through long distances.

C-clamps of normal construction are illustrated in Figure 4. The clamps A have already been screwed down into operative or clamping position, as in the formation of a rib of a boat, holding a rib R to a form F, while the clamp B has its screw S only partly screwed home. On the outer end of the screw are formed the wings S1 and S2 which ordinarily are grasped by the fingers of the workman to turn the screw.

The crank which is the subject of the present invention comprises a flat lever portion 1 terminating at one end in a transverse portion 2 bent out of the plane of such lever portion. The bend need not be and preferably is not abrupt, but the portions 1 and 2 lie in intersecting planes disposed generally perpendicular to each other in the preferred formation. The transverse portion 2 and the adjacent section of the lever portion 1 are slotted, as indicated at 3, the slot being of such size as to receive one of the wings S1 of the screw S by relative movement transversely of the screw. Spaced from the transverse portion 2 along the lever portion 1 just sufficiently to engage the opposite wing S2 are two fingers 4, projecting from the respectively opposite edges of such lever portion in the same direction as the transverse portion 2. These fingers may be bent from the plane of the lever portion into generally parallel relationship, preferably being spaced sufficiently closely, and having sufficient resilience to pinch the wing S2 when they straddle the latter. They are thus engaged by swinging of the handle about the fulcrum defined by the wing S1, as previously engaged within the slot 3.

Once engaged with this second wing S2, the resilient fingers 4 secure the handle in place against accidental displacement, so that even if the clamp is inverted, as is the lowermost one in Figure 4, the handle will not fall off. However, the pinching engagement is sufficiently slight that the handle may readily be disengaged from the screw by reverse movement to that described, and may as quickly be engaged with the screw of the next clamp.

The part of the lever portion 1 at the side of the fingers 4 remote from the transverse portion 2 constitutes means by which the user's finger or hand may turn the screw S as rapidly as the hand may be rotated. It will be noted that the rotational force is applied in the direction of the plane of the bar, so that its resistance to bending is greatest, and yet it may be made of comparatively light and inexpensive material.

It is preferred that the lever portion 1 have an upstanding handle 5 at its free end, forming therewith a crank to enable more ready rotation of the screw-engaging portion. This handle may be integral with the lever, and may be formed by a stamping and forming operation. Thus, the handle 5 illustrated is formed by blanking in the plane of the lever portion 1 a sheet portion wider than such lever portion to form wings projecting therefrom, rolling into cylindrical form or otherwise bending into three-dimensional form such wings, and then bending the handle at right angles to the general plane of the lever bar, so that these wings are directed generally towards the bar's opposite end. For further reinforcement the corners of these rolled wings of the handle 5 adjacent to the lever bar project toward such bar, as indicated at 6, serving as spacers to contact the surface of the bar when the handle has been bent, and to compensate for the spacing inevitably occurring due to the radius of bend of the neck 8 which joins the handle 5 to the lever portion. In addition, lugs 7 may be projected downwardly from the wings of the post into contact with the opposite edges of the bar, the better to transmit rotative effort to the lever portion of the crank.

I claim as my invention:

1. A C-clamp screw crank comprising a bar having a lever portion, an end portion disposed transversely of the lever portion, and formed for ready engagement, by relative movement in a direction partly axially but also partly transversely of the screw, with one wing of the C-clamp screw, and means on said bar spaced from said end portion and formed for ready engagement, by relative movement primarily axially of the screw, with the second wing of the C-clamp screw.

2. A C-clamp screw crank comprising a bar having a lever portion, an end portion disposed transversely of the lever portion, and formed for ready engagement with one wing of the C-clamp screw, and paired resilient fingers on said bar spaced from said end portion, and disposed to straddle the second wing of the C-clamp screw.

3. A C-clamp screw crank comprising a bar having a lever portion, an end portion disposed in a plane at an angle to the general plane of the lever portion, and slotted at the junction of said lever portion and said end portion for engagement upon one wing of the screw by relative movement transversely of the screw, and means on said bar spaced from said slotted portion and formed for ready engagement with the second wing of such screw by relative movement axially of the screw.

4. A C-clamp screw crank comprising a bar bent and slotted for reception of one wing of a C-clamp screw by relative movement transversely of the screw, and having paired fingers projecting transversely from the bar and spaced from its slotted portion sufficiently to straddle the second wing of said screw, the bar when so engaged extending radially of the screw for rotating the latter.

5. A C-clamp screw crank comprising a bar bent and slotted for reception of one wing of a C-clamp screw by relative movement transversely of the screw, and having paired fingers projecting transversely from the bar and spaced from its slotted portion sufficiently to straddle the second wing of said screw, the bar when so engaged extending radially of the screw for rotating the latter, said fingers being resilient and thereby pinchingly engageable with such second wing to retain the handle in engagement with the screw.

6. A C-clamp screw crank comprising a flat bar having one end disposed in a plane intersecting the general plane of the bar, this end of the bar being longitudinally slotted to receive one wing of the clamp screw, and a pair of resilient fingers projecting from the opposite edges of the bar generally parallel to such slotted bar end, and sufficiently spaced from such bar end to straddle the second wing of said clamp screw.

7. A C-clamp screw crank comprising a flat bar having one end disposed in a plane intersecting the general plane of the bar, this end of the bar being longitudinally slotted to receive one wing of the clamp screw, a pair of resilient fingers projecting from the opposite edges of the bar generally parallel to such slotted bar end, and sufficiently spaced from such bar end to straddle the second wing of said clamp screw, and an integral handle upturned from the end of said bar opposite its slotted end to complete the crank for rotating the bar and the engaged clamp screw.

8. A C-clamp screw crank comprising a flat bar having one end disposed in a plane intersecting the general plane of the bar, this end of the bar being longitudinally slotted to receive one wing of the clamp screw, a pair of resilient fingers projecting from the opposite edges of the bar generally parallel to such slotted bar end, and sufficiently spaced from such bar end to straddle the second wing of said clamp screw, an integral handle upturned from the end of said bar opposite its slotted end to complete the crank, for rotating the bar and the engaged clamp screw, and lugs downwardly directed from the handle past each side edge of the bar, to transmit a rotative force from the handle to the bar.

9. A C-clamp screw crank comprising a flat bar having one end portion disposed in a plane at an angle to the general plane of the bar, said end being formed for ready engagement, while extending lengthwise of the screw, with one wing of the C-clamp screw, and means on said bar spaced from said end portion and formed for ready engagement with the second wing of the C-clamp screw, the opposite end of said bar constituting a lever portion.

10. A C-clamp screw crank comprising a flat bar having one end down-turned generally at an angle to the plane of the bar, the bar having a slot extending both directions from such angle, to receive one wing of the clamp screw, fingers down-turned from opposite edges of the bar, towards the same side as the down-turned end, and spaced sufficiently therefrom to straddle the other wing of the clamp screw, said bar extending thence as a crank arm for rotating the thus-engaged clamp screw.

WENDELL P. RADER.

REFERENCES CITED

The following references are of record in the file of this patent:

UNITED STATES PATENTS

| Number | Name | Date |
|---|---|---|
| 664,217 | Jencke et al. | Dec. 18, 1900 |
| 918,939 | Abercrombie | Apr. 20, 1909 |
| 1,146,054 | Curry | July 13, 1915 |
| 1,663,606 | Murphy | Mar. 27, 1928 |
| 2,086,722 | Matnella | July 13, 1937 |